United States Patent Office 3,841,981
Patented Oct. 15, 1974

3,841,981
HYDROGENATION OF TAR SAND BITUMEN
Edwin T. Layng, Summit, N.J., assignor to Hydrocarbon Research, Inc., New York, N.Y.
Filed Dec. 29, 1972, Ser. No. 319,799
Int. Cl. C10g 1/00, 9/16, 23/00
U.S. Cl. 208—48 Q
10 Claims

ABSTRACT OF THE DISCLOSURE

The upgrading of crude bitumen from tar sands by the ebullated bed hydrogenation process requires a temperature control of liquid effluent to prevent excessive coke formation which limits the operable life of the process.

BACKGROUND OF THE INVENTION

The Layng U.S. Pat. No. 3,151,054 discloses an ebullated bed process for the hydrogenation of bitumen from tar sands. It also recognizes the need for gas-liquid separation of the reactor effluent which is typical in most refinery practice. However, the feature of such patent concerned the problem of recovering ash.

SUMMARY OF THE INVENTION

It has now been determined that the effluent of the tar sand bitumen hydrogenation is unusually sensitive to coke deposition which tends to form "coke" in the separator and render the process inoperable.

In accordance with my invention, I quench the reactor effluent with sufficient quench oil which is preferably recovered from the process and has the boiling range of gas oil, to lower the temperature of the total reactor liquid, including quench oil, to a temperature below coking temperatures. This also prevents the formation of two liquid phases and thereby avoids frothing and foaming.

DESCRIPTION OF PREFERRED EMBODIMENT

A tar sand bitumen of the Athabasca type, at a fluid temperature is introduced through line 10 and feed line 12 to the bottom of reactor 14. A make-up hydrogen rich gas is introduced through line 15 and recycle hydrogen gas enters in line 17 with a liquid recycle, hereinafter described, entering in line 19.

Within the reactor 14, which is maintained under upflow, liquid phase conditions such as to keep the contact solids (ash or catalyst or sand) in ebullated bed condition such as disclosed in the Johanson, U.S. Reissue Pat. No. 25,770, with the temperature and pressure being as hereinafter set forth, a conversion of at least 50% is obtained of the material in the feed boiling above 975° F. to material boiling below 975° F.

An effluent is removed at 20 from the reaction zone, such effluent including unconsumed hydrogen, other normally gaseous materials and liquid constituents having a substantially full boiling range of hydrocarbons from $C_4$ through 975° F. Under reaction zone temperature in the order of 700 to 850° F., this material contains substantial amounts of coke precursors. The separation of such composite effluent in the separator 22 into a gas phase removed at 24 and a liquid phase at 26 thus normally causes coke formation in the separator. In accordance with my invention, I find it possible to avoid such coke formation by a quench operation as hereinafter described.

Figure 1:
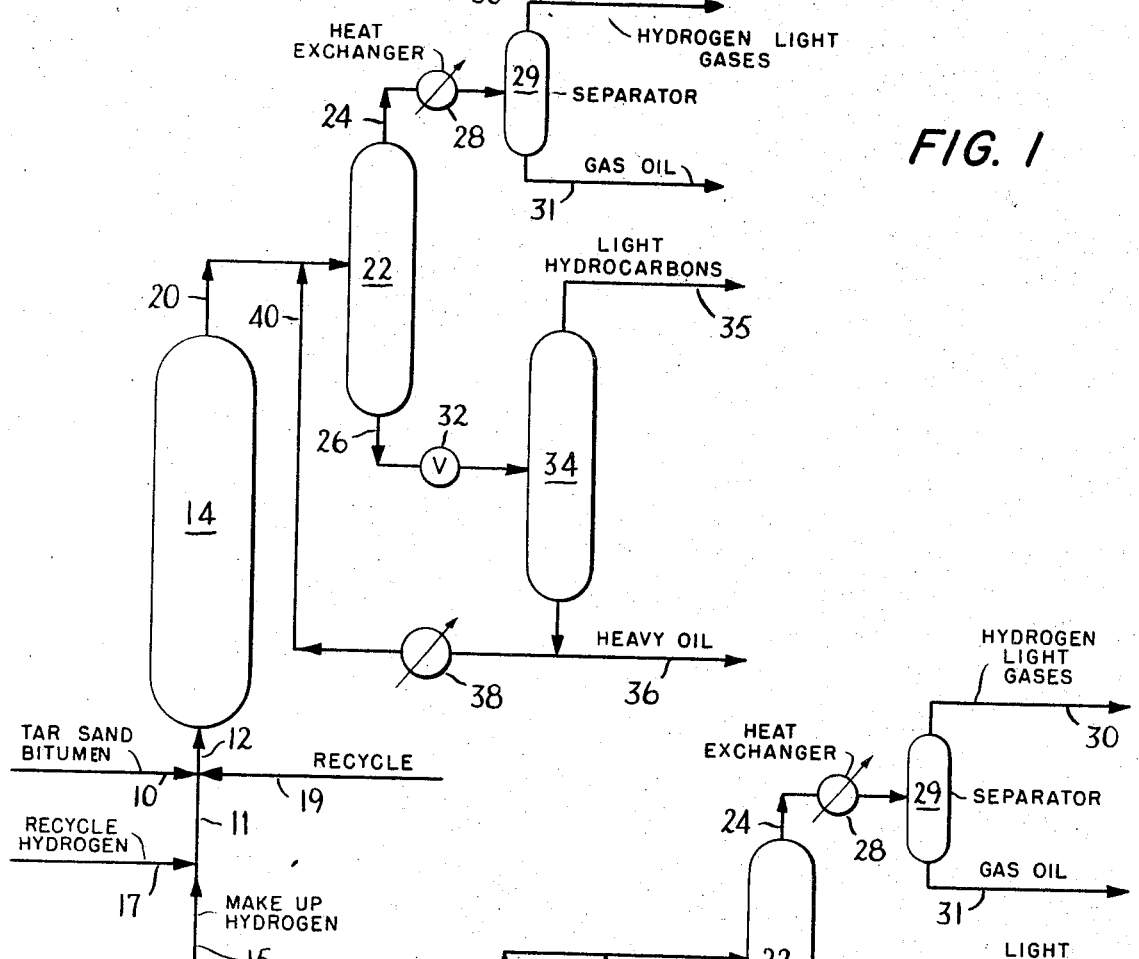
FIG. 1 is a schematic illustration of a single stage ebullated bed type processing apparatus and auxiliary equipment showing one form of quench.

As shown in FIG. 1, the vapors removed at 24 are cooled in exchanger 28, following which the mixture is further separated in separator 29 into a hydrogen and light gas stream 30 and a gas oil stream 31. The hydrogen in line 30 may be recovered in accordance with well known procedures and the purified hydrogen used as recycle hydrogen in line 17.

The liquid phase removed in line 26 may be flashed through valve 32 into separator 34 with the removal of light hydrocarbons overhead at 35 and a heavy oil fraction removed at 36. A part of this heavy oil, after suitable temperature adjustment in exchanger 38 is used as quench in line 40. In this embodiment, the quench is introduced into the effluent line 20 between the reaction zone 14 and separator 22. By quenching the effluent below incipient coking temperature which I find may vary between 500 and 650° F. with different bitumen, extended runs are made without depositing any coke in the separator 22.

Figure 2:
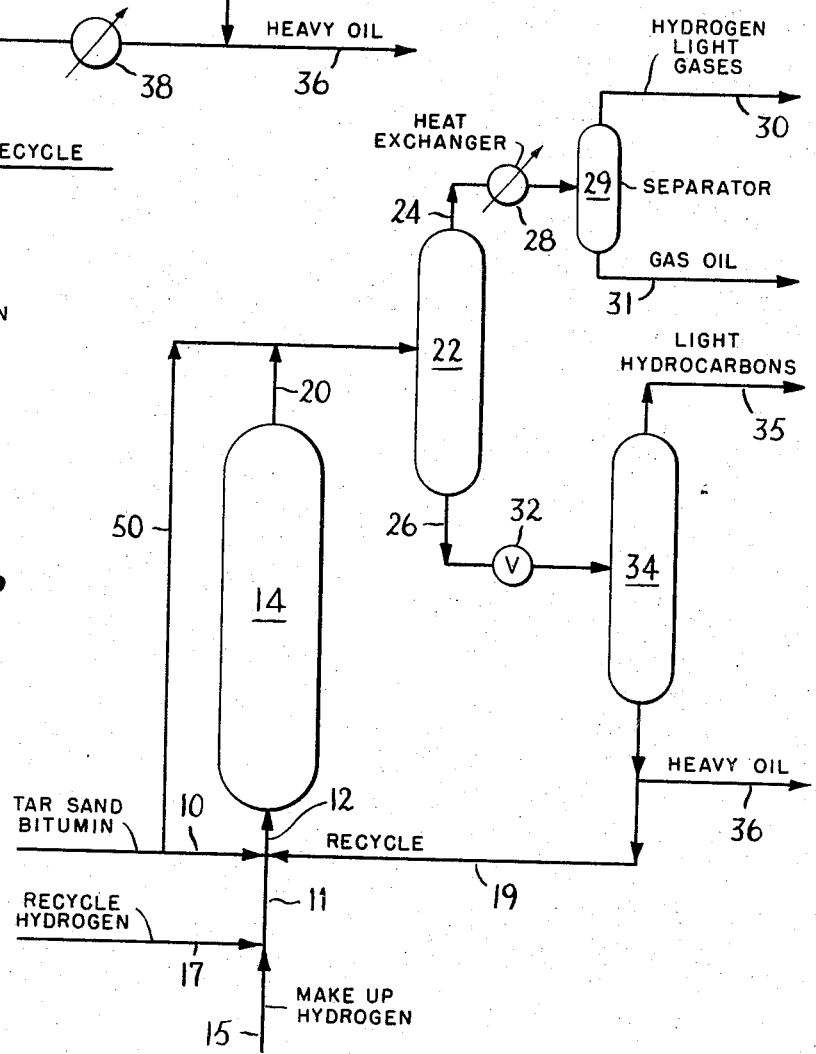
FIG. 2 is a similar figure showing a modified form of quench.

A modification of quench material is shown in FIG. 2 in which a part of the bitumen feed 10 is used in line 50 to quench the effluent. It will also be desirable to recycle some of the heavy oil 36 through the recylce line 19 to further yield maximum amounts of preferred products.

The parameters of operating conditions in the reactor 14 are:

Temperature—700–850° F. (preferably 795° F.)
Pressure—400–2000 p.s.i. hydrogen (preferably 750–1200 p.s.i.)
Space velocity—0.5 to 2.0 $V_f$/hr./$V_r$ (preferably 1.0)
Conversion of 975° F. plus material—60% min.
Hydrogen consumption—500–1500 s.c.f./bbl.

Typical Athabasca Tar Sand Bitumen have the following characteristics:

| | A | B | C |
|---|---|---|---|
| Gravity, ° API | 8.9 | 5.5 | 8.5 |
| Sulfur, wt. percent | 4.88 | 4.85 | 4.92 |
| Ash, wt. percent | 0.79 | 3.22 | 0.72 |
| Carbon, wt. percent | 82.8 | 81.2 | 83.50 |
| Hydrogen, wt. percent | 10.51 | 10.15 | 10.73 |
| Nitrogen, p.p.m. | 3,900 | 4,081 | |
| Metals, p.p.m. | 455 | 493 | |

Stocks A and C come from the same area as Stock B but have been recovered from the tar sands by a slightly different process.

While I have shown and described preferred forms of embodiment of my invention, I am aware that modifications may be made thereto within the scope and spirit of the disclosure herein and of the claims appended hereinafter.

I claim:
1. In a process for refining a tar sand derived material selected from the group consisting of a natural tar and bitumen, which refining process includes the steps of passing the feed substantially in the liquid phase through a reaction zone in the presence of particulate contact material and a hydrogen containing gas under temperature in the range of 700 to 850° F. and hydrogen partial pressure in the range of 400 to 2000 p.s.i. wherein the contact material is maintained in an ebullated state by the passage of fluids through the reaction zone and an effluent is removed from the reaction zone and passed to a separation zone and wherein the effluent is separated into at least a light oil fraction and a heavy oil fraction, the improvement which comprises quenching the effluent with a compatible oil fraction to a temperature below coking at a point prior to the separation of the effluent into its fractional components.

2. The process of Claim 1 wherein the effluent is quenched to a temperature not above 650° F.

3. The process of Claim 1 wherein the compatible oil is a gas oil recovered from the effluent.

4. The process of Claim 1 weherin the compatible oil is a heavy gas oil recovered from the effluent.

5. The process of Claim 1 wherein a part of the feed is used as quench.

6. The process of Claim 1 wherein the quench is introduced to the effluent at a point between the reaction zone and the separation zone.

7. The process of Claim 1 wherein a part of the liquid portion of the effluent is recycled to the reaction zone.

8. The process of Claim 7 wherein the recycle is a heavy gas oil boiling range material.

9. The process of Claim 1 wherein the space velocity of the feed in the reaction zone converts at least 60 percent of the material boiling above 975° F. to material boiling below 975° F.

10. In the method of upgrading a crude bitumen recovered from tar sands in which the bitumen is passed upwardly through a pressurized reaction zone in the presence of hydrogen and contact solids, and within the parameters:

Space velocity—0.5 to 2.0 $V_f$/hr./$V_r$
　　Temperature—700°–850° F.
　　Pressure, p.s.i. hydrogen—400–2000 to produce a hydrogenated liquid effluent and gas, the improvement with comprises:

(a) passing said effluent to a liquid-gas separator zone to remove gas and liquids separately therefrom;

(b) said effluent being cooled to a temperature not to exceed 650° F.;

(c) recovering a liquid fraction having a boiling range of 400–975° F. plus;

(d) and quenching said effluent (step (a)) with a part of said liquid fraction prior to introduction thereof into the liquid-gas separator zone.

References Cited

UNITED STATES PATENTS

| | | | |
|---|---|---|---|
| 2,953,514 | 9/1960 | Wilkins | 208—95 |
| 3,151,054 | 9/1964 | Layng | 208—11 |
| 3,224,959 | 12/1965 | Schlinger et al. | 208—107 |
| 3,228,871 | 1/1966 | Schlinger | 208—58 |
| 3,471,398 | 10/1969 | Borst | 208—111 |
| 3,481,860 | 12/1969 | Borst | 208—111 |
| 3,536,607 | 10/1970 | Borst | 208—61 |
| 3,544,447 | 12/1970 | Van Driesen | 208—48 |

DELBERT E. GANTZ, Primary Examiner

G. E. SCHMITKONS, Assistant Examiner

U.S. Cl. X.R.

208—102, 108, 112, 157, 159